L. C. BOND.
APPARATUS FOR MANUFACTURING ICE.
APPLICATION FILED AUG. 16, 1913.
1,099,011.
Patented June 2, 1914.
2 SHEETS—SHEET 1.
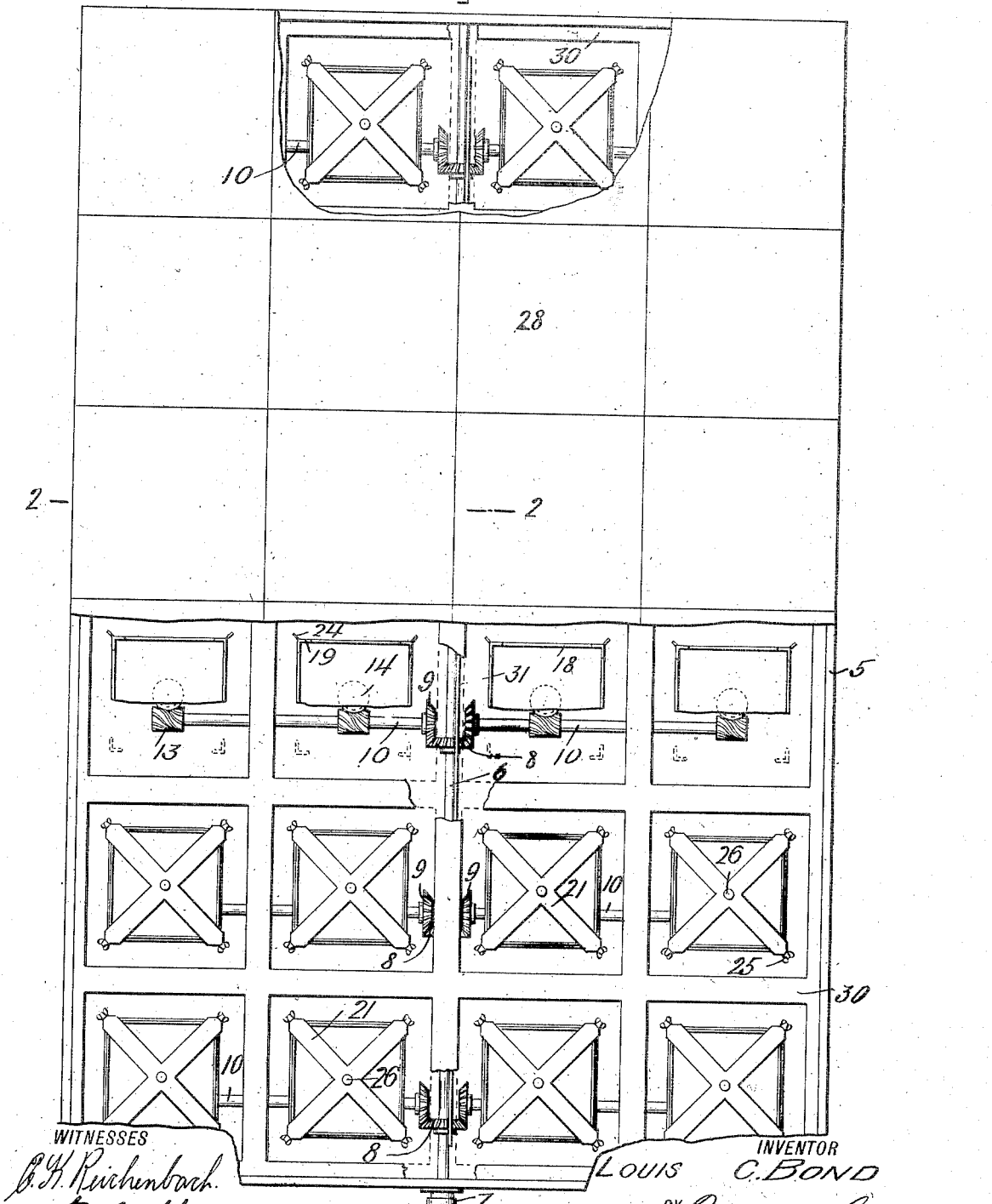

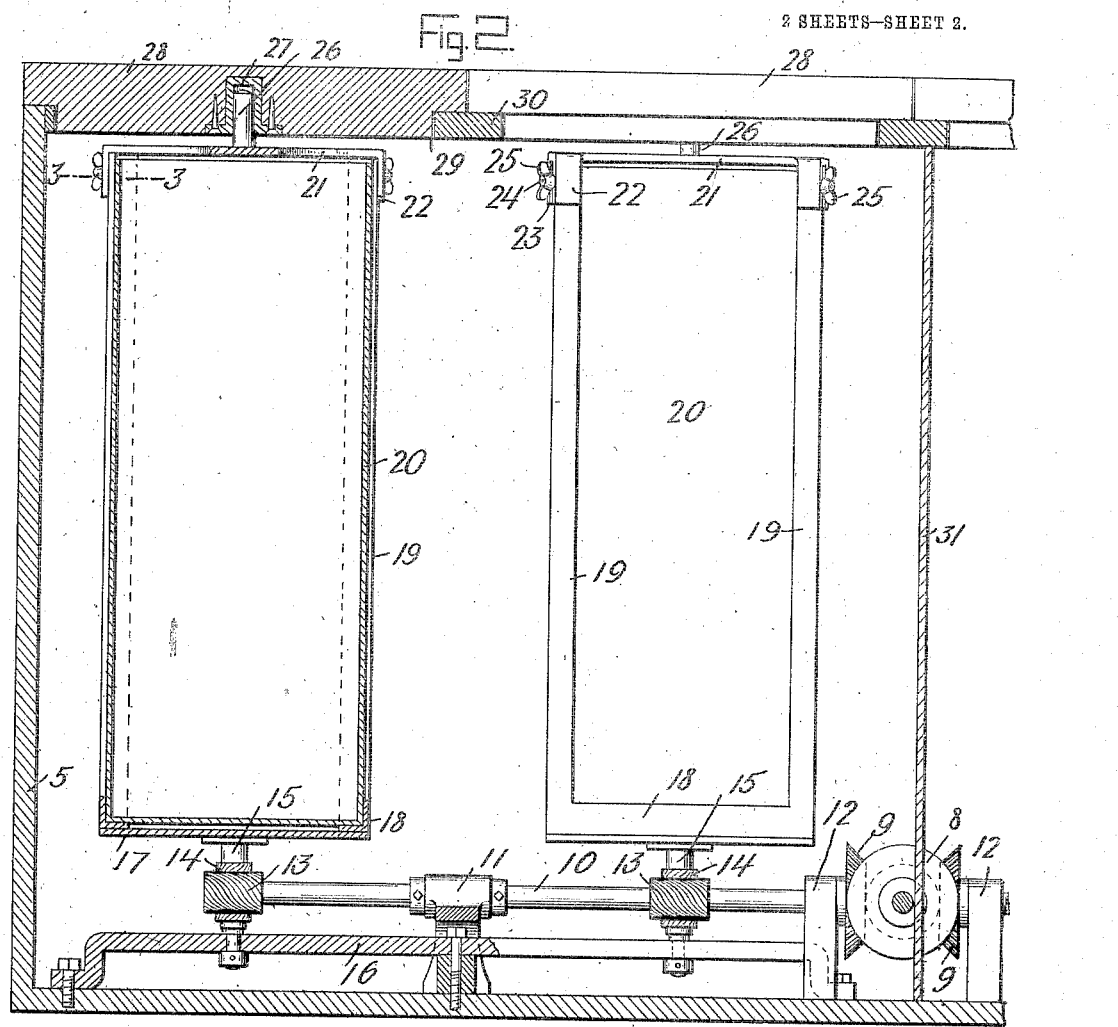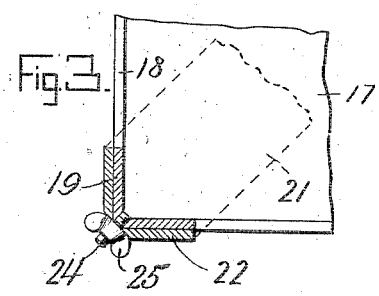

UNITED STATES PATENT OFFICE.

LOUIS CHARLES BOND, OF CHARLESTON, SOUTH CAROLINA.

APPARATUS FOR MANUFACTURING ICE.

1,099,011.  Specification of Letters Patent.  Patented June 2, 1914.

Application filed August 16, 1913. Serial No. 785,024.

*To all whom it may concern:*

Be it known that I, LOUIS C. BOND, a citizen of the United States, and a resident of Charleston, in the county of Charleston and State of South Carolina, have invented a new and Improved Apparatus for Manufacturing Ice, of which the following is a full, clear, and exact description.

The object of the invention is to provide a simple and inexpensive apparatus whereby clean ice can be manufactured from water containing impurities in suspension. This object is attained by providing moving receptacles adapted to receive the water to be frozen and positioned in the brine tank, the temperature of the brine being maintained below the freezing temperature of the water.

The invention consists of the construction and combination of parts to be more fully described hereinafter and fully set forth in the claims.

Reference is to be had to the accompanying drawings forming a part of this specification, in which like characters indicate corresponding parts in all the views and in which:

Figure 1 is a plan view of a brine tank embodying my invention and partly broken away to show the details of construction; Fig. 2 is a section on line 2—2, Fig. 1; and Fig. 3 is a section on line 3—3, Fig. 2.

Referring more particularly to the drawings, 5 represents a brine tank, preferably of rectangular form, which is centrally provided with a shaft 6 disposed in the longitudinal direction of the tank adjacent the bottom thereof. One end of the shaft 6 projects through the tank 5 where a stuffing-box 7 is provided to prevent leakage of brine from the tank at this point. The projecting end of the shaft carries means, not shown in the drawing, whereby the shaft can be actuated. Beveled gears 8 are keyed on to the shaft 6 at equal intervals, and each of the said gears 8 is in mesh with a pair of beveled pinions 9 secured to shafts 10 disposed on opposite sides of the driving shaft 6. The driven shafts 10 are supported in bearing blocks 11 and 12 secured to the bottom of the tank. Each of the driven shafts 10 carries spiral gears 13 spaced from one another and in engagement with similar spiral gears 14, each rigidly secured to a vertical trunnion 15 bearing with its lower end in a bracket 16 secured to the bottom of the brine tank. The upper end of the trunnion 15 receives a table 17 having flanged borders 18, which flanges are preferably provided at their corners with angle-iron vertical extensions 19.

Resting on the table 17 and fitting snugly between the extensions 19 is a receptacle 20 open at the top and preferably having the edges of the opening slightly below the edges of the extensions 19. Positioned on the extremities of the extensions 19, above the open end of the tank, is a spider or cross 21, each branch of which is provided at the extremity with a lateral extension of angle-iron shape fitting snugly against the exterior surface of the angle-iron extension 19. The lateral extensions 22 of the spider are at the corner provided with a slot 23 engaged by a stud 24 secured in the corner of the extension 19. A butterfly nut 25 fits on the stud 24 and whereby the extensions 22 of the spider are secured to the vertical extensions 19.

The spider 21 is centrally provided with a pin 26 projecting above the spider and engaging a socket 27 secured into a cover 28. The socket 27 forms the upper bearing for the frame carried by the table 17, the lower bearing being formed in the bracket 16 by the trunnion 15, which carries the table. The cover 28 has its borders adjacent the lower face undercut, so as to fit snugly into openings 29 of a frame 30 which is secured to the sides of the brine tank 5 at the top thereof. The openings 29 in the frame 30 are concentric with the axis of rotation of the framework carried by the table 17. The undercut portion of the covers forms a shoulder in the same, which rests on the frame 30, and whereby the covers are supported on the frame. Furthermore, this shoulder makes a tight joint, which helps to insulate the interior of the tank from the surrounding atmosphere.

The brine tank 5 is also provided with a central, longitudinal separating wall 31, which extends from the bottom of the tank to the frame 30 but which does not reach the end walls of the tank but leaves a passage therebetween. The purpose of this is to permit a better circulation of the brine, which will be obtained due to the fact that the receptacles positioned on the opposite sides of the separating wall 31, or the baffle plate, rotate in opposite directions, as can be seen from the drawing. Furthermore, the brine tank is provided with coils of pipes, not shown in the drawing, through which ammonia is circulated to maintain the temperature of the brine below the freezing point of water. This feature was omitted from the drawing as the same does not form a part of the invention and would only make the drawings obscure.

The use of my invention is as follows: The receptacles 20, filled with water, are placed in the frame work formed by the angle-iron extensions 19 and the table 17. The spiders 21 are secured in place, then the covers 28 are placed in position. The driving shaft 6 is then set in motion, causing the rotation of the driven shafts 10, and thereby causing the rotation of the receptacles 20. This rotation of the receptacles agitates the water therein, and as the freezing of the water in the receptacles 20 takes place, due to the brine contacting with the walls of the receptacle, the freezing proceeds from the lateral surface of the receptacle toward the center of the same. The impurities in suspension in the water which freezes will move toward the center, and the freezing can be stopped before the central portion of the body of the water in the receptacle is frozen, so as to allow the elimination of that part containing the dirt. It is understood that this central, non-frozen portion will form a very small part of the frozen body of water. The frozen body can be extracted from the receptacle, while the water containing the dirt will remain in the receptacle. But, if desired, the central and non-frozen portion of the body containing water and dirt can be withdrawn and replaced by clean water and the freezing continued until the entire body is frozen, forming a frozen body without a central opening.

While in the drawings the receptacle for the water to be frozen is shown of a prismatic form, and, therefore the openings in the frame 30 and the turning table are of rectangular form, it is understood that cylindrical-shaped receptacles can be used, in which case the openings in the frame and the table carrying the receptacles will be of circular shape. Furthermore, the receptacles, if desired, can be driven from the upper end instead of from the lower.

Having thus described my invention, I claim as new and desire to secure by Letters Patent:

1. In an apparatus for manufacturing ice,—a brine tank having a separating wall in the center thereof leaving passages near the end walls of the tank; receptacles adapted to receive water to be frozen positioned in said tank on the opposite sides of said separating wall; and means for moving said receptacles on the opposite sides of the wall in opposite directions.

2. In an apparatus for manufacturing ice,—a brine tank; a wall separating said tank into two parts communicating at the edges of said wall adjacent the lateral surface of the tank; revoluble frames positioned in said tank on the opposite sides of said wall; means for revolving said frames positioned on the opposite sides of the wall in opposite directions; and a tank adapted to receive water to be frozen in each of said frames.

3. In an apparatus for manufacturing ice,—a brine tank; a separating wall in said tank establishing communication between the parts of the tank adjacent the lateral surface of the same; a driving shaft in said tank; driven shafts in said tank positioned on the opposite sides of said separating wall; transmission means from the driving shaft to the driven shafts whereby said driven shafts on the opposite sides of said separating wall are rotated in opposite directions; revoluble frames positioned on the opposite sides of said separating wall in said tank; transmission means connecting said revoluble frames to said driven shafts; and a receptacle adapted to carry water to be frozen engaging each of said frames.

4. In an apparatus for manufacturing ice,—a brine tank; a separating wall in said tank establishing communication between the parts of the tank adjacent the lateral surface of the tank; revoluble frames positioned on the opposite side of said separating wall in said tank and each comprising a table having vertical extensions; a spider adapted to engage said extensions at their extremities, said table and spider having means engaging the tank whereby said frame is rotatable in said tank; means for rotating said frames positioned on opposite sides of said separating wall in opposite directions; and a receptacle adapted to receive water to be frozen engaging each of said frames.

5. In an apparatus for manufacturing ice,—a brine tank formed of two intercommunicating parts; revoluble frames in each of said parts of tank; receptacles carried by said frame and adapted to receive water to be frozen; and means for revolving said frames, said frames in one part of the tank being revolved in a direction opposite to the frames in the other part of the tank.

In testimony whereof I have signed my name to this specification in the presence of two subscribing witnesses.

LOUIS CHARLES BOND.

Witnesses:
CHAS. E. MILLIGAN,
WILLIAM N. BREUER.